Sept. 8, 1942.  E. R. CHILD  2,295,159
AIRPLANE CONTROL BALANCING SYSTEM
Filed Aug. 25, 1938   2 Sheets-Sheet 1

INVENTOR
EDWARD R. CHILD.
BY
ATTORNEY

Sept. 8, 1942.  E. R. CHILD  2,295,159
AIRPLANE CONTROL BALANCING SYSTEM
Filed Aug. 25, 1938  2 Sheets-Sheet 2

INVENTOR
EDWARD R. CHILD
BY
ATTORNEY

Patented Sept. 8, 1942

2,295,159

UNITED STATES PATENT OFFICE 2,295,159

AIRPLANE CONTROL BALANCING SYSTEM

Edward R. Child, Kenmore, N. Y., assignor to Curtiss-Wright Corporation, a corporation of Delaware Application August 25, 1938, Serial No. 226,631

17 Claims. (Cl. 244—83)

This invention relates to aircraft and is concerned with balancing systems for aircraft controls.

An object of the invention is to provide elastic means operating upon the control system to counter-balance or partly counter-balance the aerodynamic forces tending to return control surfaces to a neutral position after they have been displaced for control functions. A further object is to provide a counter-balancing system which is confined wholly to the control operating mechanism, thus avoiding the conventional aerodynamic balances which tend to produce an undesired increase in drag on the control airfoils. The invention briefly consists of elastic devices acting upon the control stick or rudder pedals of an aircraft, the devices having no effect when the stick or pedals are in a neutral position, but having an increasing effect tending to displace the control stick or pedals after they have once been moved in any direction from the neutral position. Since the stick and pedals are connected to control airfoils which tend to neutralize in high speed flight, and which require substantial force on the stick or pedals for their displacement, the elastic means above mentioned counteracts the aerodynamic forces, tending to reduce the control pressure which may be required upon the stick or pedals for changing the attitude of the aircraft.

A further object of the invention is to provide elastic means for balancing control airfoils, the elastic force produced thereby being variable in its intensity substantially in proportion to the flight speed of the aircraft, whereby the effort necessary to move the stick or pedals maintains a substantially constant proportion to the reactive force on the airfoil throughout the speed range of the aircraft for a given displacement. The force necessary to displace the control airfoils from neutral increases from low flight speed to high flight speed and, with present aircraft having a very wide speed range between stalling speeds and maximum speeds, the provisions of the invention provide means to overcome the great difference in control force necessary to accomplish the control function throughout the indicated speed range.

A better understanding of the details of the invention will be appreciated in reading the annexed detailed description in connection with the drawings, in which.

Figure 1:
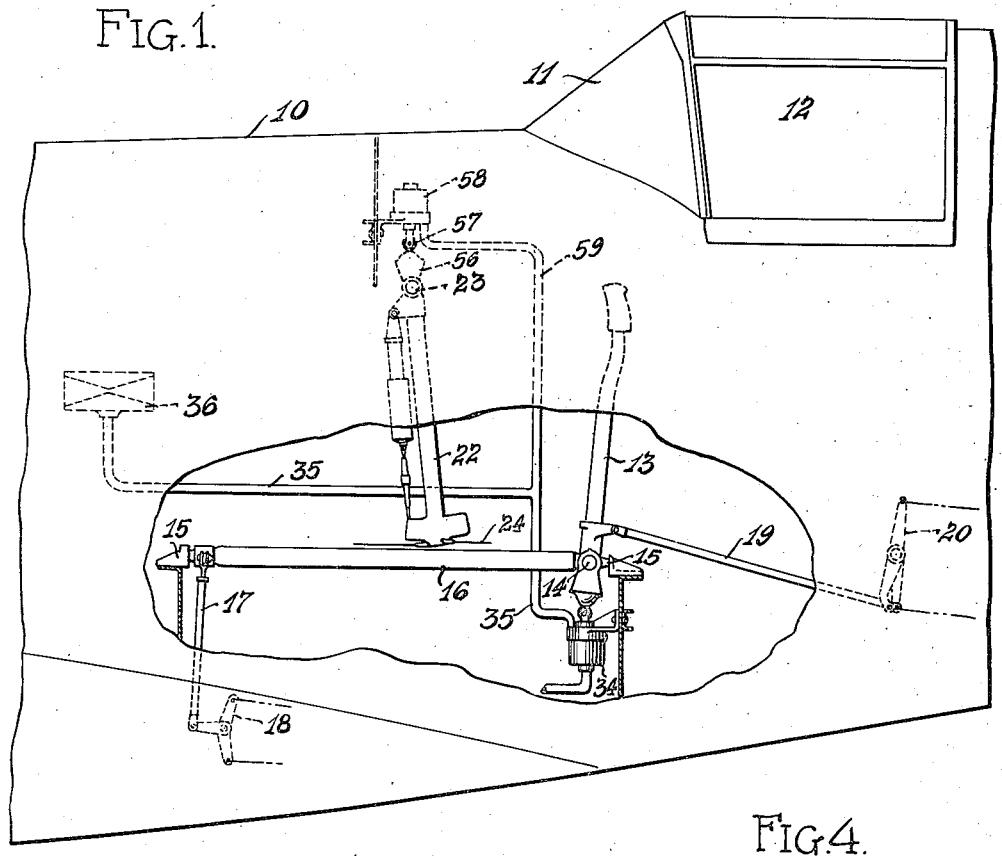
Fig. 1 is a partial elevation of an aircraft fuselage showing the improved balance system.

In the figures, 10 indicates an aircraft fuselage provided with the usual windshield 11 and cockpit closure 12 defining within the fuselage a pilot compartment within which is located a control stick 13 laterally pivoted at 14 and longitudinally pivoted at 15, the stick being supported with respect to the pivots 15 by a torque tube 16. The latter is provided with a crank 17 connected through a bellcrank and cable mechanism 18 to the ailerons in the conventional manner. A link 19 connects the stick 13 with a lever mechanism 20 connected to the elevators in a conventional manner. Fore and aft movement of the stick 13 thereby effects longitudinal control of the aircraft while lateral movement of the stick 13 provides for lateral control. Rudder pedals 22 hinged to the aircraft at 23 are connected with the rudder through cables 24 to effect directional control of the aircraft in the conventional manner.

Figure 2:
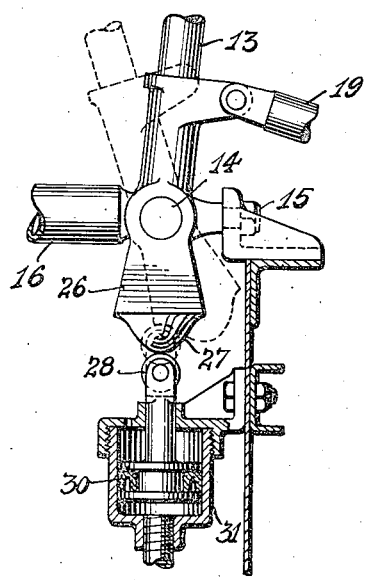
Fig. 2 is an enlarged detailed elevation, partly in section, showing one embodiment of the balance organization, and Figs. 3 to 8 inclusive are enlarged elevations showing still further modifications of the balancing device.
Figure 3:
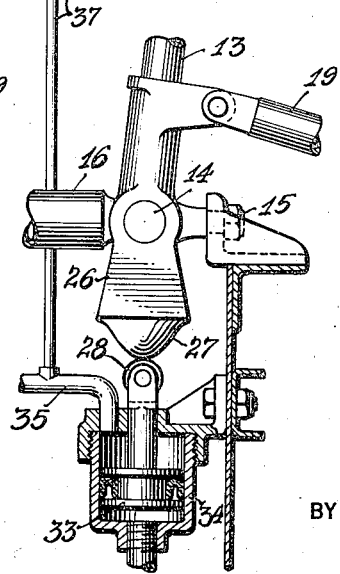
Figure 4:
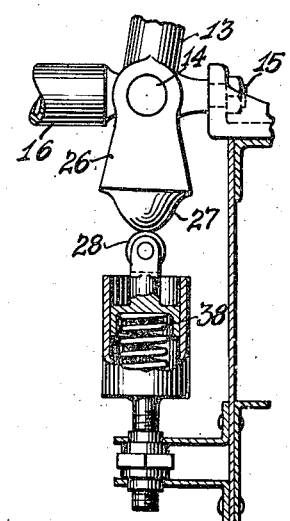

Figs. 2, 3, and 4 show the control stick 13 with an extension 26 having its lower end formed as a cam of revolution as at 27, the cam being of oblate spheroidal form. When the stick is in neutral position the major axis of the cam 27 is aligned with the axis of movement of a cam follower 28 which is elastically urged upwardly by various means presently to be described. When the stick is in neutral position as shown, the follower 28 contacts the end point of the cam 27, merely pressing upwardly thereon without producing any force tending to displace the stick. However, if the stick be moved either laterally or longitudinally, the follower 28 will bear upon a sloping face of the cam 27 and by the upward force imposed by the follower, the stick will be subject to a force tending to displace it with a constantly increasing effect, counter-balancing the aerodynamic force imposed by the elevators or ailerons.

In Fig. 2, the cam follower 28 is carried by a piston 30 slidable in a cylinder 31, the bottom end of the cylinder being subject to fluid pressure developed by a suitable pump driven by the engine or by aerodynamic action responsive to aircraft flight speed. If the latter form of pump is used, the pressure in the cylinder 31 will be generally proportional to airflow velocity so that the balancing force imposed by the cam follower will increase with flight speed.

In Fig. 3, as well as in Fig. 1, the cam follower 28 is carried on a piston 33 slidable in a cylinder 34, the top part of the cylinder being connected through a tube 35 to a venturi 36 placed in the airstream. The venturi produces a vacuum in the top part of the cylinder 34 which is responsive to velocity squared times air density, this force being the same as that which acts upon the airfoils to be balanced. By adjusting the intensity of the vacuum imposed on the piston by means of an air-bleed 37 the degree of airfoil balance may be controlled in accordance with the desire of the pilot, for any speed. Over the entire speed range of the aircraft, therefore, the force necessary to move the stick 13 a given angle may be held substantially constant, as distinguished from the conventional case in which the force necessary to displace the stick a given angle increases with air speed.

Fig. 4 shows a simple arrangement in which the cam follower 28 is backed up by a spring 38, exerting a substantially constant force upon the cam 27.

Figure 5:
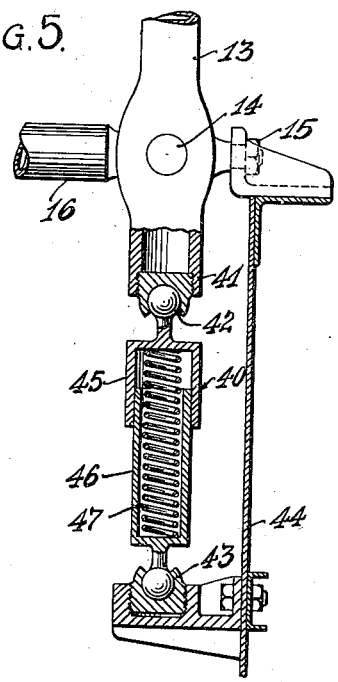
Figure 6:
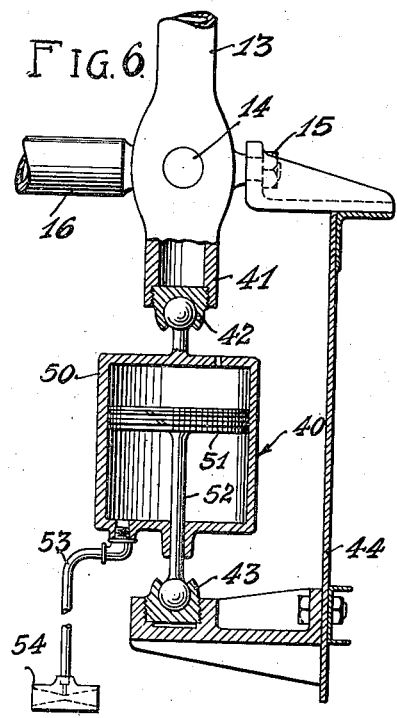

Figs. 5 and 6 show alternative arrangements of the balancing system in which an elastic toggle link 40 acts upon a stick extension 41 through a ball and socket joint 42, the bottom end of the link 40 being held in a ball and socket joint 43 fixed to the aircraft structure 44. In Fig. 5 the link 40 comprises telescoping sleeves 45 and 46 urged apart by a spring 47. When the centers of the joints 42 and 43 are aligned with the stick pivot 14, the spring 47 will have no effect in displacing the stick angularly. However, when angular movement of the stick is effected by the pilot, the spring 47 will exert a displacing force upon the stick substantially in proportion to the angle to which it may be displaced.

In Fig. 6 the link 40 comprises a cylinder 50 jointed at 42 and a piston 51 connected with the joint 45 through a piston rod 52. The lower side of the cylinder is connected through a tube 53 to an air-stream venturi 54 whereby a vacuum will be imposed on the lower face of the piston 51 tending to extend the piston with respect to the cylinder in proportion to air velocity squared times its density. The link 40 of Fig. 6 will operate mechanically in the same manner as the showing of Fig. 5 but its balancing force will increase with air speed in the same manner as the device of Fig. 3.

If a pressure of greater magnitude than that afforded by venturi vacuum is desired, fluid pressure means may be used for providing the elastic force to balance stick loads, the hydraulic pressure being controlled by a servo-valve responsive to air speed. In other words, venturis such as 36 or 54 may operate on a followup valve which controls oil pressure which in turn is transmitted to a piston-cylinder device operating upon the control stick or upon some part of the mechanical control system.

In Fig. 1, I also show the balancing cam and cam follower device applied to the rudder pedal 22. In this case, the cam, such as 56, may be a flat cam since the rudder pedal is subject only to movement about a single axis such as 23. Any one of the pressure, spring, or vacuum device previously described may be used to urge the cam follower 57 toward the cam 56. As shown in Fig. 1, a vacuum system is used comprising a cylinder 58 connected by a tube 59 to the tube 35.

Figure 7:
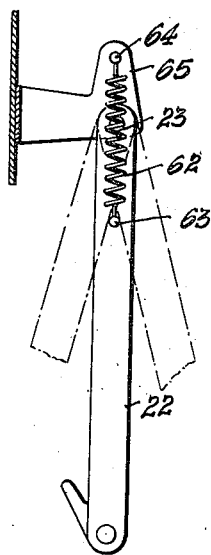

Fig. 7 shows the rudder pedal 22, pivoted at 23, with a spring 62 articulated at a lower end to the rudder pedal at 63 and articulated at its upper end at 64 to an extension 65 of the rudder pedal support. In Fig. 7 the solid lines show the rudder pedal in a neutral position wherein the tension in the spring 23 has no effect in displacing the pedal. If the latter be voluntarily displaced either forwardly or rearwardly, the spring will swing away from alignment with the pedal pivot 23 and will exert an air load balancing force urging the pedal away from its neutral position.

Figure 8:
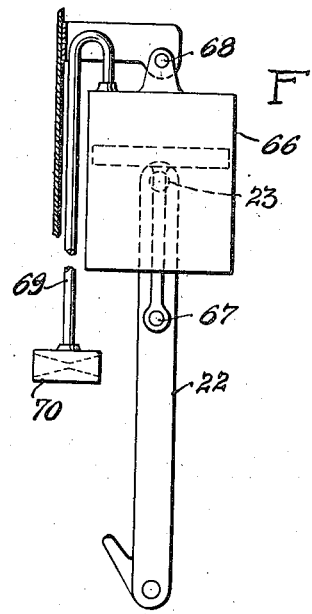

In Fig. 8, the rudder pedal 22, as before is pivoted at 23 to the aircraft structure and a piston-cylinder unit 66 is pivoted at its ends to the pedal, at 67, and to the aircraft structure, at 68. The upper part of the cylinder is connected by a tube 69 to an airstream venturi 70 so that the unit 66 exerts an air load balancing force proportional to air speed in a manner similar to that described in connection with Figs. 1, 3, and 6.

For the purpose of trimming the air controls to compensate for wing heaviness, or longitudinal or directional unbalance, means may be provided for adjusting the position of the neutral axis of the elastic balancing means on the control stick or rudder pedals. Although such adjusting means are not shown, it will be readily appreciated that, in Figs. 1 to 4, the axis of the cam follower 28 may be adjustable by suitable screw means. In Figs. 5 and 6 the lower ball joint 43 could be moved laterally or longitudinally, and in Figs. 7 and 8 the pivots 64 or 68 could be adjustable longitudinally.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a balancing system for an aircraft control surface subject to aerodynamic reaction, an operating member pivoted for angular control movement and connected with the surface, a cam formed on said member having a neutral point most remote from the member pivot and having other points progressively closer to the member pivot, and an elastically pressed cam follower movable toward the member pivot and engaging said cam, the cam engagement being at said neutral point when the control surface is neutral.

2. In a movable control airfoil balancing system wherein the force on the airfoil, when displaced from neutral a certain amount, varies with the airspeed, means for producing a force variable substantially in proportion to airspeed, manually controlled means positively connected to operate said airfoil, and mechanism acting on said operating means in opposition to the airfoil force energized by said force producing means.

3. In a movable control airfoil balancing system wherein the air force on the airfoil, when displaced from neutral, tends to return the airfoil to a neutral position, manually controlled operating means positively connected to move the airfoil, and resilient means variable in response to air speed urging said operating means to a displaced position substantially in proportion to the neutralizing air force on said airfoil.

4. In an aircraft control system, a stick movable longitudinally and laterally respectively for longitudinal and lateral aircraft control, a member pivoted for longitudinal and lateral movement with the stick, an oblate spheroidal cam on the member having its major axis passing through the member pivot, a cam follower movable substantially on a straight line toward and away from said pivot, and elastic means urging the follower into contact with the cam.

5. In an aircraft control system, a stick movable longitudinally and laterally respectively, for longitudinal and lateral aircraft control, a member pivoted for longitudinal and lateral movement with the stick, an oblate spheroidal cam on the member having its major axis passing through the member pivot, a cam follower movable substantially on a straight line toward and away from said pivot, and force producing means responsive in force increment to increasing airspeed for urging the follower into contact with the cam.

6. In an aircraft control system, a stick movable longitudinally and laterally respectively for longitudinal and lateral aircraft control, a member pivoted for longitudinal and lateral movement with the stick, an oblate spheroidal cam on the member having its major axis passing through the member pivot, a cam follower movable substantially on a straight line toward and away from said pivot, and fluid pressure means urging said follower into contact with the cam.

7. In a control system for aircraft having an airfoil movable between a neutral and a displaced position, wherein, when displaced, the relative airflow imposes a neutralizing force proportional to air speed and airfoil displacement, a control member directly connected to the airfoil for moving same and means operative on and in response to member displacement for imposing a displacing force on the member and airfoil proportional both to the degree of displacement and the air speed.

8. In a control system for aircraft having an airfoil movable between a neutral and a displaced position, wherein, when displaced, the relative airflow imposes a neutralizing force on the airfoil, a manually operable control member directly connected to the airfoil for moving same, means organized to force said member and airfoil from the neutral position upon member movement from neutral, and means for controlling the force exerted thereby in direct proportion to aircraft speed.

9. In a control system for aircraft having an airfoil movable between a neutral and a displaced position, wherein, when displaced, the relative airflow imposes a neutralizing force on the airfoil, a control member pivoted to the aircraft and directly connected to the airfoil, a spring strut pivoted to the aircraft and to the control member, the latter pivot being alined with the control member pivot and the strut-aircraft pivot when the control member is in neutral position, acting to force said member toward a more displaced position upon initiation of member displacement and misalignment of the strut-member pivot from the member aircraft and strut-aircraft pivots.

10. In a control system for aircraft having an airfoil movable between a neutral and a displaced position, wherein, when displaced, the relative airflow imposes a neutralizing force on the airfoil, a control member pivoted to the aircraft and directly connected to the airfoil, a cam element on said member spaced from its pivot, a member axially alined with said pivot and having a cam element axially slidable therein, engaging said first cam element, and elastic means urging said cam elements toward contact, said cam elements being so profiled as to urge said control member farther from its neutral position after initial displacement therefrom.

11. In a control system for aircraft having an airfoil movable between a neutral and a displaced position, the relative airflow imposes a neutralizing force on the airfoil, a control member pivoted to the aircraft and directly connected to the airfoil, a cam element on said member spaced from its pivot, a member axially alined with said pivot and having a cam element axially slidable therein, engaging said first cam element, elastic means urging said cam elements toward contact, said cam elements being so profiled as to urge said control member farther from its neutral position after initial displacement therefrom, said elastic means comprising an expansible pneumatic mechanism the elastic force of which is controlled in proportion to speed of the aircraft.

12. In aircraft, a control stick pivoted for lateral swinging, for lateral control, and for longitudinal swinging for longitudinal control, a projection below the stick pivot, an abutment below said projection, and elastic means urging said projection away from said abutment, said projection and elastic means being so formed as to respond to the force of said elastic force of said elastic means when the stick is displaced from a neutral position.

13. In aircraft, a control stick pivoted for lateral and longitudinal swinging, a projection below the stick pivot having a ball joint, an abutment below the projection having a ball joint, and an elastically extendible strut connecting said ball joints.

14. In aircraft, a control stick pivoted for lateral and longitudinal swinging, a projection below the stick pivot having a ball joint, an abutment below the projection having a ball joint, and an elastically extendible strut connecting said ball joints, said strut comprising a spring to provide the elasticity thereof.

15. In aircraft, a control stick pivoted for lateral and longitudinal swinging, a projection below the stick pivot having a ball joint, an abutment below the projection having a ball joint, and an elastically extendible strut connecting said ball joints, said strut comprising a pneumatic diaphragm, and means establishing a pneumatic pressure therein proportional to speed of the aircraft.

16. In aircraft, a control stick pivoted for lateral and longitudinal swinging, a projecting member below the stick pivot and swingable with the stick, a member alined with the stick pivot and elastically urged toward the pivot, a cam follower carried by one said member, and a cam carried by the other said member, said cam and follower having a central neutral zone of contact in line with the stick pivot and alined member and having contact zones beyond said neutral zones wherein said alined member urges said stick from its neutral position.

17. In aircraft, a control system including a hinged control airfoil, means to actuate said airfoil, and means to maintain the force reaction on the actuating means substantially proportional to airfoil displacement and to maintain said reaction substantially constant regardless of the changes in force on the airfoil due to different air speeds, comprising an elastic balance responsive in the elastic force imposed thereby to aircraft speed, and means to apply the force from said balance to the actuating means.

EDWARD R. CHILD.